Nov. 5, 1929.    D. B. SIMPSON    1,734,275
ALARM FOR DEFLATED PNEUMATIC TIRES
Filed Aug. 3, 1928
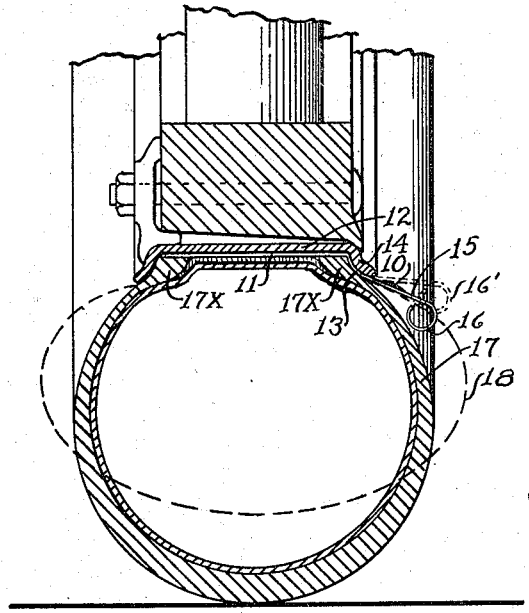
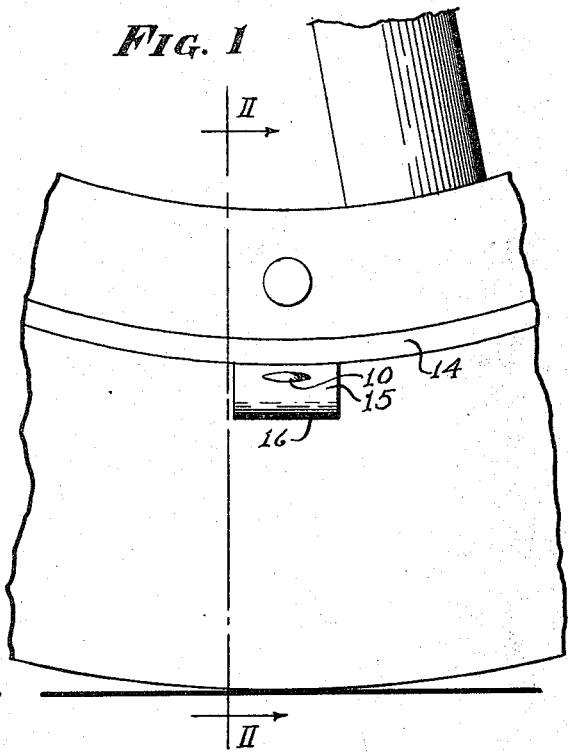
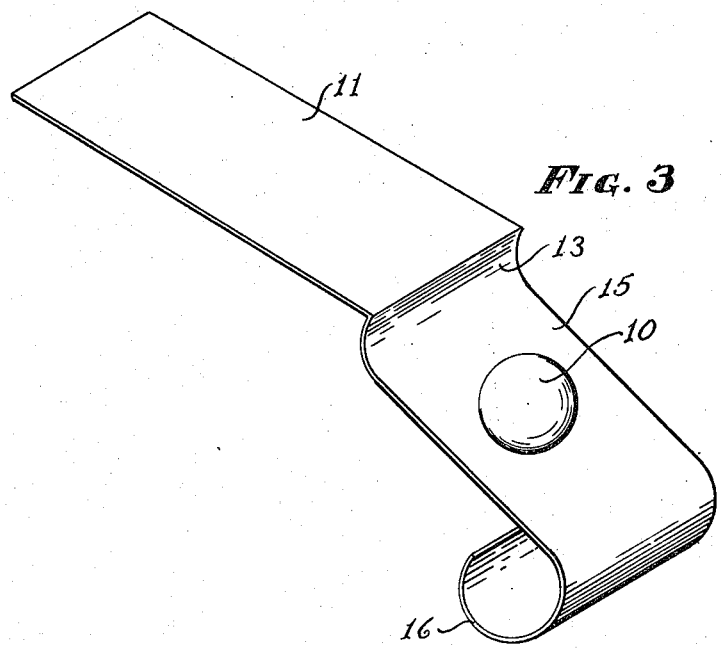
INVENTOR.
David B. Simpson
BY William C. Edwards Jr.
ATTORNEY.

Patented Nov. 5, 1929

1,734,275

UNITED STATES PATENT OFFICE

DAVID B. SIMPSON, OF WICHITA, KANSAS

ALARM FOR DEFLATED PNEUMATIC TIRES

Application filed August 3, 1928. Serial No. 297,193.

The invention relates to a mechanism and means whereby the driver of an automobile equipped with pneumatic tires may be advised of the approaching deflation of a tire, or so that he may have the opportunity of stopping his automobile and examining his tires in order that he may note their amount of air pressure and be able to fill the deflating tire or correct leaky valves etc., prior to the usual time, namely, after the tire has possibly been ruined by running on it in its deflated condition.

In the drawings Fig. 1 is a side view of a tire mounted upon a tire rim, which in turn has been properly affixed to the periphery of the automobile wheel and shows in addition the position of my improved alarm mechanism as arranged in said combination. Fig. 2 represents a sectional view taken along the line II—II in Fig. 1 looking in the direction of the arrows. Fig. 3 shows an enlarged detail view of the alarm mechanism. Similar numerals of reference indicate corresponding parts throughout all the figures of the drawings.

Referring to the drawings; a sheet metal plate is fashioned as disclosed to form a flat portion 11 then bent at 13 sharply then extended for a distance as a flat portion 15 and curled as at 16 inwardly. At 10 is seen a depressed portion in the part 15. Now I slip the flat end portion 11 under the bead of the tire casing 17, between the bead 17ˣ and the rim 12. The curved portion 13 follows the curved flange 14 of the rim 12 and the part 15 extends outwardly or so that the curved part 16 just clears the wall of the casing 17 when the tire is properly inflated.

Now if the tire should become partially deflated, for instance from the action of a leaky valve, a tack puncture, etc., the casing 17 would tend to flatten out, as indicated by the dotted line 18, when in contact with the ground. As the tire rolls along, this condition 18 of course then occurs beneath the alarm mechanism at the time it is brought adjacent the ground, thus the curved part 16 is pressed upwardly to the position 16′ through the bulging of the tire 17 as seen at 18. During this movement the depressed part 10 is forced to buckle in an effort to conform to the shape of the tire 18. This buckling taking place place suddenly and produces a snapping noise which may be heard by the driver of the automobile. As the wheel rolls on and the pressure as indicated by 18 is removed from the alarm at 16′ the element 16 will spring back to its original position, thus causing the part 10 to snap back into its former relationship and for a second time it emits a snapping noise. Now this continued snapping noise will be readily detected by a careful driver and the warning thus given will be acted upon since it means a saving to him in tire depreciation. He is thus enabled to eliminate bead cutting and other destroying influences, for instance, in a nail puncture, frequently the nail will penetrate the tire in the first case and form only a small hole through the tube, but upon a continued running upon the flat tire, more cuts are made in the tube and frequently it is ruined beyond repair simply through the fact that the driver did not know soon enough that his tire was punctured. My device can be cheaply fabricated, it will not detract from the appearance of the assembly and can be most easily installed and performing as it does such a useful function, it should be of great benefit to the public in general.

Such modifications may be employed as lie within the scope of the appended claims.

Having fully disclosed my invention, what I now claim as new and desire to secure by Letters Patent is:

1. In an alarm for deflated pneumatic tires; a flat portion adapted to fit between the wheel rim and the tire casing and tube, a curved central portion leading therefrom adapted to contact the flange of said rim, an extended portion adapted to clear the tire casing when properly inflated, and an inwardly curved end element presenting an incompleted tubular element for said extended portion normally not contacting an inflated tire but adapted to be contacted by a deflating tire; and a depression in the depending portion susceptible to emitting a snapping noise under conditions specified.

2. A metallic plate comprising a flat element at one end and an inwardly curved partially completed tubular element at the opposite end, a central bent portion and an extended portion intermediate the incompleted tubular end portion and the bent portion, and a depression in said extended portion.

3. In an alarm for deflated pneumatic tires, a flat portion adapted to fit between the wheel rim and the tire casing and tube, a curved central portion leading therefrom adapted to contact the flange of said rim, an extended portion adapted to clear the tire casing when properly inflated, said extended portion terminating in a curved stiffening edge element normally not contacting an inflated tire but adapted to be contacted by a deflating tire; and a depressed portion as a diaphram formed intermediate the central curved portion and the stiffening edge susceptible of emitting a snapping noise when deflation of the tire occurs.

In testimony whereof I affix my signature.

DAVID B. SIMPSON.